UNITED STATES PATENT OFFICE.

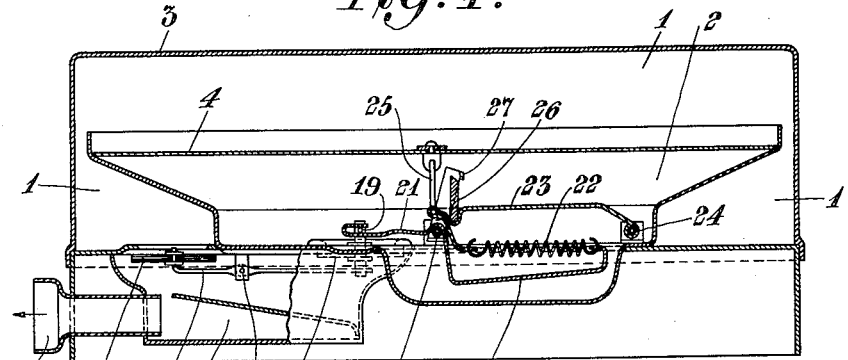
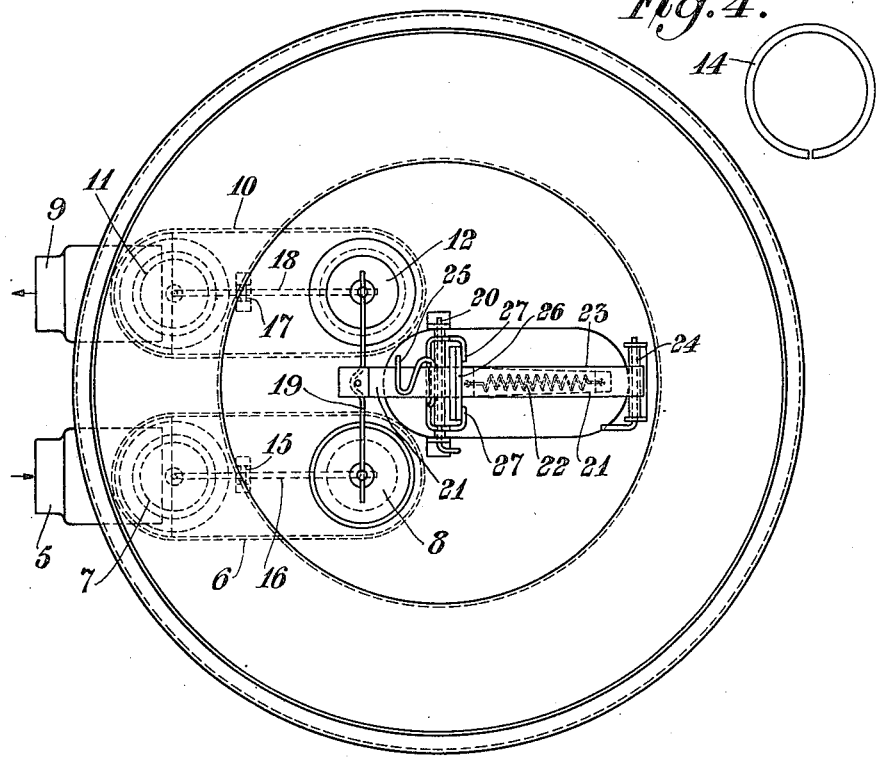

GEORG KARL VILHELM JOHANSON, OF STOCKHOLM, SWEDEN.

GAS METER.

1,417,998.  Specification of Letters Patent.  Patented May 30, 1922.

Application filed September 2, 1919. Serial No. 321,100.

*To all whom it may concern:*

Be it known that I, GEORG KARL VILHELM JOHANSON, a subject of the King of Sweden, residing at Stockholm, in the Kingdom of Sweden, have invented a new and useful Improvement in Gas Meters, of which the following is a specification.

The present invention relates to an improvement in gas meters of the kind which comprise two measuring chambers separated by a movable diaphragm, which chambers may alternately be brought into communication with the inlet and outlet of the meter by means of valves which are opened and closed by the movements of the diaphragm caused by the pressure of the gas in the measuring chambers. When the one measuring chamber communicates with the inlet the other measuring chamber communicates with the outlet. The gas pressure in the firstnamed measuring chamber will rise owing to gas flowing into the chamber, on account of which the diaphragm will slowly move towards and into the lastmentioned measuring chamber which communicates with the outlet, as the gas in said chamber escapes through the outlet. Gas meters of this kind have been designed in which the diaphragm operates the valves by the intermediary of a spring mechanism which, notwithstanding the slow movements of the diaphragm, effects a rapid opening and closing of the valves so that no gas can pass through the meter without being measured. Such spring mechanisms heretofore proposed for this purpose are encumbered with the inconvenience, however, that their resistance to the movements of the diaphragm varies within comparatively wide limits, with the result that the gas pressure in the gas pipes beyond the meter and thus also at the gas-jets becomes uneven.

The purpose of the improvement forming the subject of the present invention is to provide a spring mechanism for transmitting the movement from the diaphragm to the valves, by means of which mechanism the said inconvenience is avoided. For this purpose the improvement is broadly characterized by this that the spring mechanism consists of a tension helical spring which is inserted between the free ends of two pivoted levers one of which is connected with the diaphragm and the other of which is connected with the valves, and the turning of which levers is limited in such manner that they are only capable of turning through small angles to either side of the connecting line between the turning points or fulcra of the levers. In this manner it is secured that the variations in the length of the spring occurring by the movements of the mechanism only become inconsiderable, and that consequently the load on or the tension of the spring becomes as constant as possible, so that also the counter pressure against the movements of the diaphragm and thus also the gas pressure at the gas-jets become practically constant. The levers may suitably be so arranged relatively to one another that the pull of the helical spring on each lever is always directed approximately towards the turning point of the lever, that is to say, so that it has a component the continuation of which runs through said point. In this manner it is secured, on the one hand, that the spring mechanism requires a small space, and, on the other hand, that the extension or stretching of the helical spring begins immediately after reversal of the direction of movement of the lever connected with the diaphragm on account of which the opening and closing of the valves also take place as rapidly as possible.

In the accompanying drawing an embodiment of the invention is shown by way of example. Fig. 1 shows a cross section of a gas meter according to the invention, and Fig. 2 shows a plan view of the meter with the upper portion of the casing and the diaphragm removed. Figs. 3 and 4 are details. Fig. 3 showing a section of the valve, and Fig. 4 showing a plan view of the elastic spring in the same.

The gas meter shown is provided with two measuring chambers 1 and 2 which are located in a common casing 3. The two measuring chambers are separated by a partition which consists of a flexible diaphragm 4 of gas-tight material. The gas inlet 5 opens into a chamber 6 beneath the bottom of the casing, the communication of said chamber with the two measuring chambers 1 and 2 being controlled by two inlet valves 7 and 8, respectively, whereas the gas outlet 9 leads from another similar chamber 10, the communication of which with the measuring chambers 1 and 2 is controlled by two outlet valves 11 and 12, respectively. All said valves are made as disk valves, and each separate valve consists of a piece of leather or the like 13 which is stretched over a resilient or elastic wire ring 14, as shown in Figs. 3 and 4, so that the valve becomes light and works silently. Each of the two inlet valves 7 and 8 is secured at one end of a two-armed lever 16 which turns on a pivot 15 in such manner that when the valve 7 is closed, the valve 8 is open, and vice versa. The valves 11 and 12 are supported in similar manner on a lever 18 turning on the pivot 17 so that they will be opened and closed alternately. The inlet valves 7 and 8 close against their seats from above, whereas the outlet valves 11 and 12 close from below, as shown in Fig. 1.

The two inner valves 8 and 12 which control the connection with the measuring chamber 2, are coupled together by means of a rod 19 which is preferably slightly elastic and the middle point of which is connected with one end of a two-armed lever 21 turning on the pivot 20. To the opposite end of said lever one end of a helical spring 22 is secured the other end of which is secured to the free end bent downwards of an one-armed lever 23 turning on the pivot 24. The said helical spring pulls on the free ends of the two levers 21 and 23 in the direction towards their axes of turning 20 and 24, respectively. The lever 23 is connected with the diaphragm 4 by means of a link 25, and supports a guide plate 26 which cooperates with two hooks 27 turning on the pivot 20 and rigidly connected with the lever 21 in such manner that said plate prevents the lever 21 from turning until the lever 26 has turned so far upwards or downwards that the hooks 27 may pass the upper or the lower edge of the plate.
The device above described operates in the following manner:

When the various parts occupy the positions illustrated in the drawing the valve 7 is closed, the valve 8 is open, the valve 11 is open, and the valve 12 is closed. The gas inlet 5 thus communicates with the measuring chamber 2 beneath the diaphragm 4, whilst the measuring chamber 1 communicates with the outlet 9. The gas then flows into the chamber 2 and forces the diaphragm 4 upwards, so that the gas in the chamber 1 is driven out through the outlet 9. When the diaphragm moves upwards it brings along the lever 23, which will thus turn upwards on its pivot 24. The spring 22 is thereby stretched. The lever 21 will remain in the position shown, however, as the guide plate 26 prevents the hooks 27 from turning to the left in Fig. 1, until the lever 23 has moved so far upwards that the hooks 27 may move past the lower edge of said plate. The free end of the lever 23, that is to say, its point of attachment to the spring 22, has then also moved so far upwards that it is located above the turning pivot 20 of the lever 21, consequently, when the plate 26 releases the hooks 27 the lever 21 will rapidly turn in a counter-clockwise direction in Fig. 1 through an angle which is dependent upon the stroke of the valves and the elasticity of the rod 19. The levers 16 and 18 are simultaneously turned in such manner that the valves 8 and 11 previously open become closed, whereas the valves 7 and 12 previously closed are opened. The measuring chamber 2 which is filled with gas, is thus brought into communication through the valve 12 with the outlet 9, while the empty measuring chamber 1 is connected through the valve 7 to the inlet 5. The gas now flows into the chamber 1 and forces the diaphragm 4 downwards bringing along the lever 23 until the hooks 27 can move past the upper edge of the plate 26, when the lever 21 and thus also all valves are again thrown back to the positions shown in Fig. 1.

In this manner the measuring chambers 1 and 2 are alternately filled and emptied. On account of the spring 22 inserted between the diaphragm and the valve, the movements of the valves take place very rapidly and at definite moments of time which are accurately determined by the movements of the plate 26 and thus also of the diaphragm. If a suitable counter is attached to the lever 21 the measuring results indicated on such counter will be very reliable.

I claim:

1. In a gas meter, the combination of two measuring chambers, a movable diaphragm separating said chambers, an inlet to said chamber, an outlet from said chamber, valves between each of said chambers and said inlet and said outlet, a spring mechanism between said diaphragm and said valves comprising a lever and means whereby said lever is connected with the diaphragm, a second lever, means whereby said lever is connected with the valves, means for locking said second lever against movement during the movement of the diaphragm until it reaches its limit positions of movement, a tension helical spring stretched between the swinging ends of said levers, and means for limiting the turning of said levers in such manner that they are only capable of turning through small angles to either side of the connecting line between the fulcra of said levers.

2. In a gas meter, the combination of two measuring chambers, a movable diaphragm separating said chambers, an inlet to said chambers, an outlet from said chambers, valves between each of said chambers and said inlet and said outlet, a spring mechanism between said diaphragm and said valves comprising a lever and means whereby said lever is connected with the diaphragm, a second lever, means whereby said lever is connected with the valves, means for locking said second lever against movement during the movement of the diaphragm until it reaches its limit positions of movement, a tension helical spring stretched between the swinging ends of said levers, and means for limiting the turning of said levers in such manner that they are only capable of turning through small angles to either side of the connecting line between the fulcra of said levers and the levers being arranged in such manner relatively to one another that the pull of the helical spring on each lever is always directed approximately towards the fulcrum of the lever.

3. In a gas meter, the combination of two measuring chambers, a movable diaphragm separating said chambers, an inlet to said chambers, an outlet from said chambers, valves between each of said chambers and said inlet and said outlet, a spring mechanism between said diaphragm and said valves comprising a lever and means whereby said lever is connected with the diaphragm, a guide member on said lever, a second lever, means whereby said lever is connected with the valves, locking hooks connected with said second lever and cooperating with said guide member in such manner as to prevent said second lever from turning until said first named lever occupies certain limit positions, a tension helical spring stretched between the swinging ends of said levers, and means for limiting the turning of said levers in such manner that they are only capable of turning through small angles to either side of the connecting line between the fulcra of said levers.

GEORG KARL VILHELM JOHANSON.